United States Patent [19]

Schwarze et al.

[11] Patent Number: 5,024,318

[45] Date of Patent: Jun. 18, 1991

[54] CONVEYOR STORAGE APPARATUS

[76] Inventors: Ralph W. Schwarze, 12468 Robleda Rd., Los Altos, Calif. 94022; Thomas D. Dickson, Jr., 2427 Via De Los Milagros, Pleasanton, Calif. 94566

[21] Appl. No.: 383,286

[22] Filed: Jul. 18, 1989

Related U.S. Application Data

[63] Continuation of Ser. No. 195,518, May 18, 1988, abandoned, which is a continuation of Ser. No. 47,153, May 6, 1987, abandoned.

[51] Int. Cl.$^5$ ............................................. B65G 25/00
[52] U.S. Cl. ............................... 198/465.2; 198/465.4; 198/803.8; 294/27.1; 294/90; 211/122; 312/201
[58] Field of Search ................ 198/465.2, 803.8, 678, 198/465.4, 803.01, 795, 678.1; 312/266, 201, 307; 294/87.28, 33, 27.1, 90; 414/736, 737; 211/121, 122

[56] References Cited

U.S. PATENT DOCUMENTS

| | | | |
|---|---|---|---|
| 1,640,401 | 8/1927 | Flintham et al. | 198/795 |
| 1,705,703 | 3/1929 | Baker | 198/795 X |
| 3,206,006 | 9/1965 | Meeder et al. | 198/803.15 X |
| 3,552,536 | 1/1971 | Emary | 198/795 X |
| 3,587,888 | 6/1971 | Warren | 414/737 X |
| 3,941,237 | 3/1976 | MacGregor, Jr. | 198/803.8 X |
| 4,168,775 | 9/1979 | Mueller | 198/803.01 X |
| 4,362,498 | 12/1982 | Harry et al. | 198/795 X |
| 4,466,530 | 8/1984 | Stückler | 198/795 X |
| 4,503,964 | 3/1985 | Kampf et al. | 198/465.2 X |
| 4,687,093 | 8/1987 | Marshall et al. | 198/795 X |

OTHER PUBLICATIONS

PN International Article on Track Stars (2 pages).

*Primary Examiner*—Robert P. Olszewski
*Assistant Examiner*—Cheryl L. Gastineau
*Attorney, Agent, or Firm*—Irell & Manella

[57] ABSTRACT

A selectively operable, continuous-loop conveyor provides support and transporation of containers containing spices or the like to and from a transfer station in which the containers are inserted in or removed from carriers which support them along the conveyor. The carriers include guide members which maintain the relative orientation between the carriers and the track. A drive hub with fingers extending into the track forces carriers disposed in that region adjacent to the fingers along a portion of the track, and thereby forcing other carriers in the track around the track. Further, a bar extending across the face of the rack has two ends, each of which may be pushed to drive the carriers in a corresponding different direction. Each carrier is in the form of a downwardly facing cup with spaced inwardly extending, biased members which engage the edges of a container inserted in the cup. Any of the containers supported in the apparatus may thus be brought to the transfer station in the front of the apparatus to provide access by the user.

27 Claims, 4 Drawing Sheets

CONVEYOR STORAGE APPARATUS

This is a continuation of Ser. No. 195,518, filed May 18, 1988, now abandoned, which is a continuation of Ser. No. 047,153, filed May 6, 1987, now abandoned.

BACKGROUND AND SUMMARY OF THE INVENTION

This invention relates to a device for storing a plurality of objects, and more particularly, to such a device for conveying stored objects to and from a transfer station where access to the objects is provided.

Providing convenient and accessible storage of various objects has been an age old problem. For instance, if too many things are stored on a single shelf, the items stored in the back are difficult to get to. It is thus necessary to remove those in the front in order to reach those in the rear.

Various devices have been developed in order to provide for the organized and accessible storage of objects. For instance, shelves which are limited in depth to the size of a single object have been used. This certainly has a limitation in that relatively few objects can be stored.

Another device which has been developed is commonly referred to as a "lazy susan", which comprises a typically round platform mounted for rotation on a base. Objects on opposite sides of the platform can be positioned respectively at a common location for access by rotating the platform. However, such devices are also limited in that they generally only provide direct access to the objects stored on the peripheral edge of the platform. Any objects stored behind them are difficult to reach. Further, such devices are normally stored on a shelf, thereby taking uP the entire shelf, and preventing the use of the space above the lazy susan.

Yet another form of storage apparatus includes a slide bar mounted on a frame which can be removed from a frame. This slide bar generally either contains lids into which containers are screwed for support, or is provided with hooks to which objects are attached. In order to reach one of the objects stored in the rear, it is necessary to pull the entire rack out, remove the desired object, and replace the rack. When it is desired to return the object to the rack, it is necessary to remove the slide bar again so that the object can be placed back on the rack. Thus, although this system provides for storage and access to a multiple of objects, it is inconvenient in that it requires the removal of several of the objects at a time in order to obtain access to one.

The present invention overcomes these problems in the prior art. In particular, the present invention provides an apparatus for storing a substantial number of objects or containers. Further, the device is driven so that individual carriers supporting an object or container can be transported, selectably, from a front or transfer station to a remote or storage region. Any time a supported object or container is desired, it may be selectively produced at the transfer station.

Thus, the present invention provides for storage of a large plurality of objects with the objects being stored one behind the other. Further, such objects may be individually removed and reinserted in the apparatus for use.

More specifically, the invention provides carrier means for supporting objects to be stored. A track means defines a track extending from a transfer station, where an object may be transferred to and from the carrier means, to a location remote from the transfer station. The carrier means are supported in the track. Selectably operable drive means is provided for moving the carrier means along the track between the transfer station and the remote location.

In a preferred embodiment of the present invention, a continuous-loop conveyor track is provided with carriers supported in the track for supporting the individual containers. The carriers are in the form of an inverted cup so that the containers can be supported from the underside of a shelf. Each cup includes projections which extend inwardly from the sides of the cup for engaging a container disposed therein. A guide member extends from the cup into the track for maintaining the relative orientation of the cup, and therefore the container, relative to the track. Further, the conveyor is driven by a reversible motor. A bar extending across the face of the unit is operable for driving the motor in reverse directions, depending on which end of the bar is pressed. The carriers are driven around the conveyor track by a rotatable hub which has fingers extending into an arcuate section of the track. The fingers force the containers in the track around the conveyor over a predetermined drive region. The carriers fill the track so that when one is forced along the track, all of the other carriers are correspondingly transported along it. Thus, rotation of the hub causes continuous movement of the carriers in the track around the loop.

It will be seen that the present invention provides a storage apparatus in which a large number of objects can be stored with each being presentable at a front transfer station for individual removal and insertion. By maintaining the relative orientation of the carriers in the track, a label associated with an object supported by the carrier will always have the same orientation. Thus, a simplified conveyor system is provided which is economical to produce and durable and easy to operate.

These and other features and advantages of the present invention will be more clearly understood from a consideration of the drawings and the following detailed description of the preferred embodiment.

BRIEF DESCRIPTION OF THE DRAWINGS

With reference to the accompanying four sheets of drawings.

DETAILED DESCRIPTION OF THE PREFERRED EMBODIMENT

Figure 1:
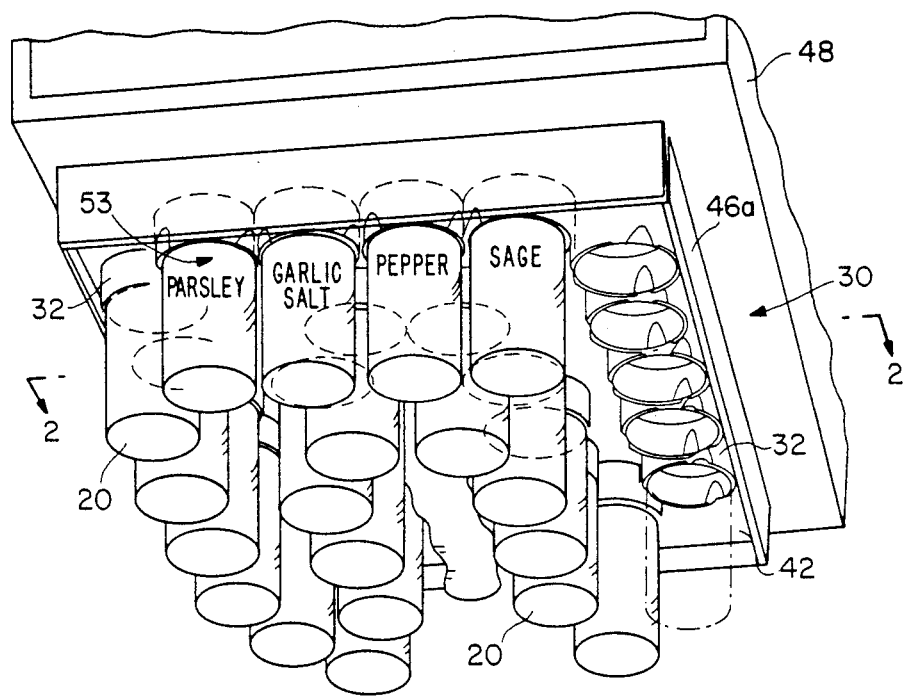
FIG. 1 is a Perspective view of the preferred embodiment of the present invention installed on the lower surface of a shelf, for supporting containers.
Figure 2:
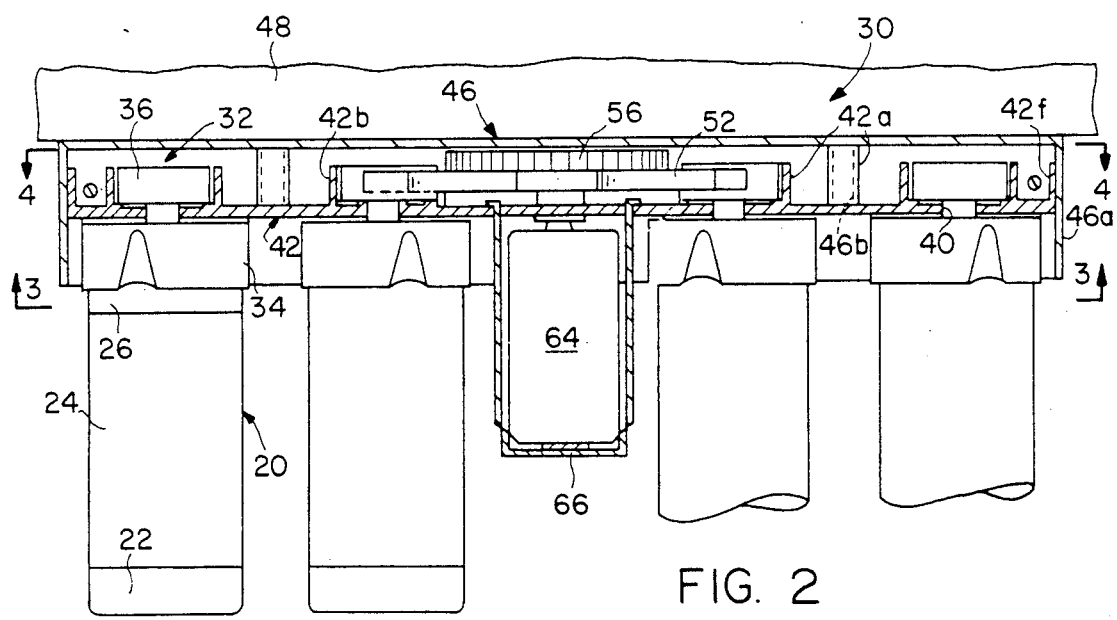
FIG. 2 is a cross-sectional view of the apparatus of FIG. 1 taken along line 2—2.

Referring initially to FIGS. 1-4, the preferred embodiment of the present invention is designed for use with spices, herbs and the like, which are conventionally sold in cylindrically shaped jars, such as jars 20 shown in FIGS. 1 and 2. These jars include a base 22, typically made of plastic or glass, a label 24 attached to the base, and a screw-top lid 26.

Figures 7, 8, 9, 10, 11:
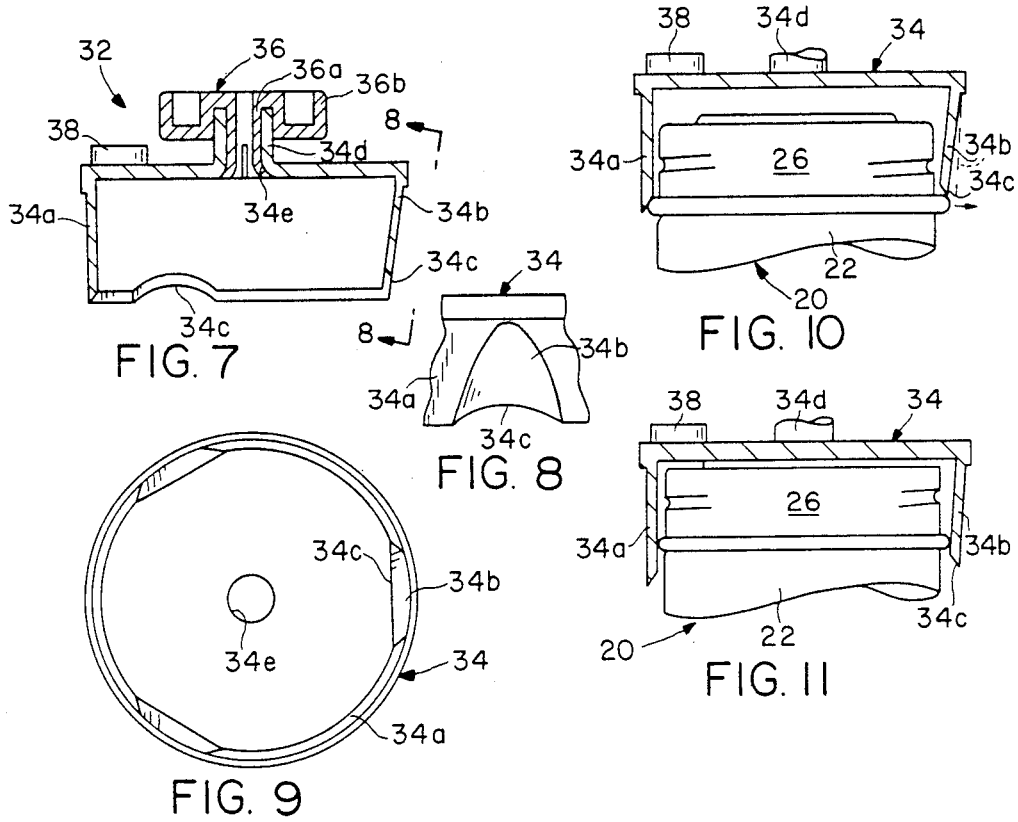
FIG. 7 is a cross-sectional view of a preferred carrier used in the apparatus of FIG. 1.
FIG. 8 is a fragmentary side view taken along line 8—8 of FIG. 7.
FIG. 9 is a bottom view of the carrier of FIG. 7.
FIGS. 10 and 11 are views similar to FIG. 7 illustrating the insertion and support of a container in the carrier.

An apparatus 30 made according to the present invention supports containers 20 in a suspended position, as shown. Specifically, each container 20 is supported in a carrier 32, as shown in FIGS. 7-11. Carrier 32 includes a downwardly open cup member 34 having generally cylindrical sides 34a, as shown in FIG. 9, and three regularly circumferentially spaced gripping members 34b which provide means for frictionally engaging opposing sides of a container 20. Gripping members 34b may also be considered projections extending into the cup of cup member 34.

Each gripping member is generally planar, as shown in cross-section in FIG. 7, and is disposed at an angle converging downwardly relative to the longitudinal axis of the cylindrical sides of cup member 34. Thus, when viewed in cross-section, as shown by the bottom exposed edge 34c in FIG. 9, gripping member 34b appears as a chord extending across the edges of the circular cup member sides 34a when in a relaxed or first position.

As seen from the side as shown in FIGS. 7 and 8, edges 34c are arcuate. This allows the edge of a container to slip progressively downward along the edges 34c until the bottom point of the edge is reached, such as is shown in FIG. 10. When in this position, the pressure of the lip of the lid against gripping member 34b forces it in an outward direction, as shown by the arrow in FIG. 10. As the lid seats into cup member 34; the gripping members 34b are in what may be referred to as a second position displaced outwardly from its original or first position. With cup member 34 being integrally made of a generally resilient material, gripping members 34b are flexible. Because they are spaced radially inwardly, as compared to the circular sides 34a, they apply an inward force or bias pressure to a container disPosed within cuP member 34, thereby holding it in a suspended position.

Disposed centrally of the roof of cup member 34 is an upwardly extending tube portion 34d containing an internal channel 34e which flares outwardly adjacent the inside edge of cup member 34. Eccentrically disposed on the top surface of cup member 34 is a round knob or guide member 38 which has approximately the same diameter as the outer diameter of tube portion 34d. As will be seen, this diameter is slightly less than the width of a track in a conveyor, which will be described shortly. Guide member 38 is formed in a circular T-shape, with the stem of the T inserted into a corresponding bore in the outer margin of the top surface of cup member 34, as shown.

Figure 4:
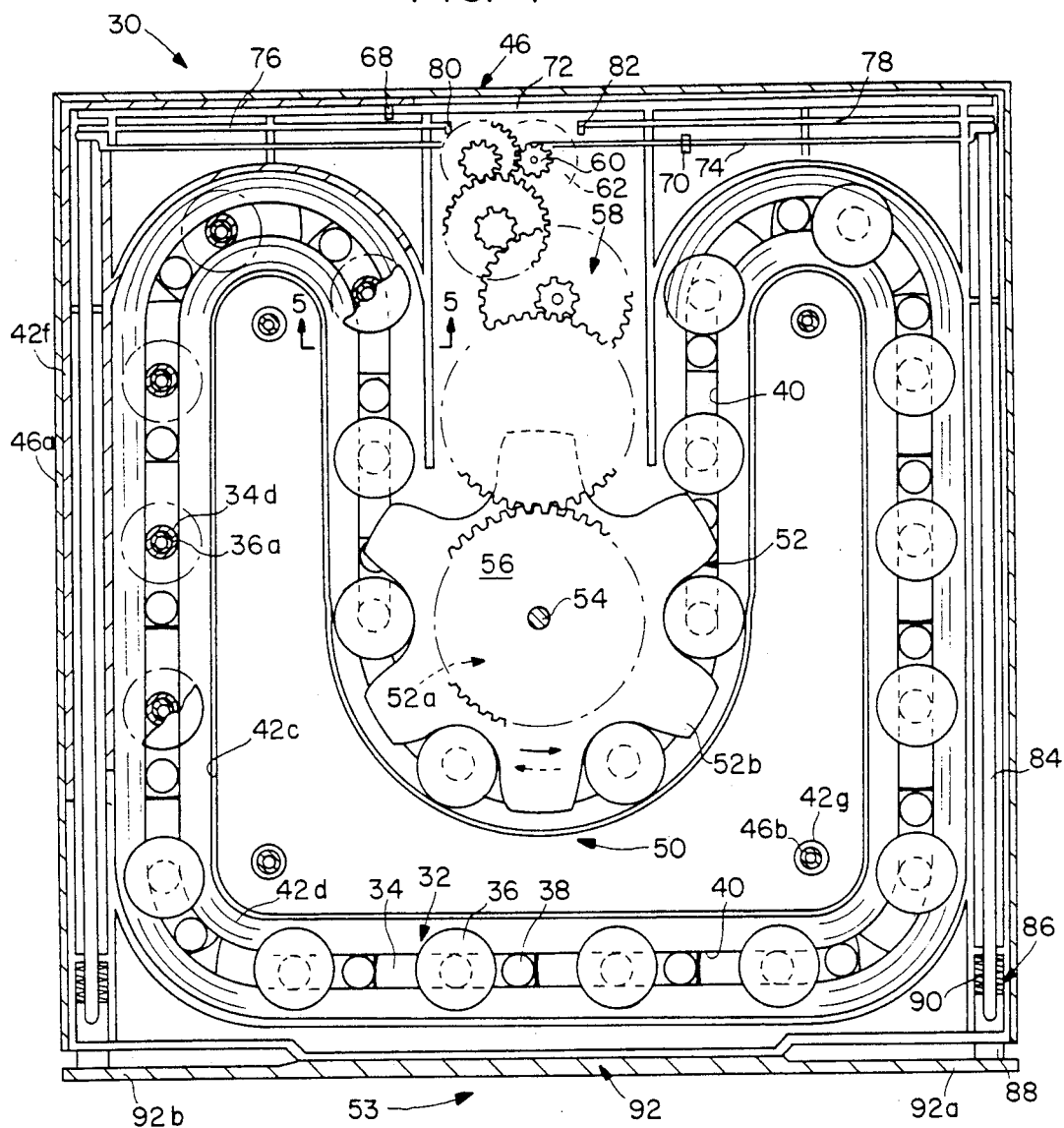
FIG. 4 is a cross-sectional view taken along line 4—4 in FIG. 2.

A cup support member 36 is generally T-shaped, with a circular stem portion 36a and a top 36b, which is circular when viewed from the top, as shown in FIG. 4. The outer diameter of stem 36a is approximately the same as the inner diameter of channel 34e, and the base of it flares outwardly. During assembly, cup member 34 is placed below the track of the conveyor with tube portion 34d extending up into the track. Support member 36, and in particular stem 36a, is sufficiently resilient that it may be inserted into channel 34e, with the two being held together in a friction press fit.

Figure 3:
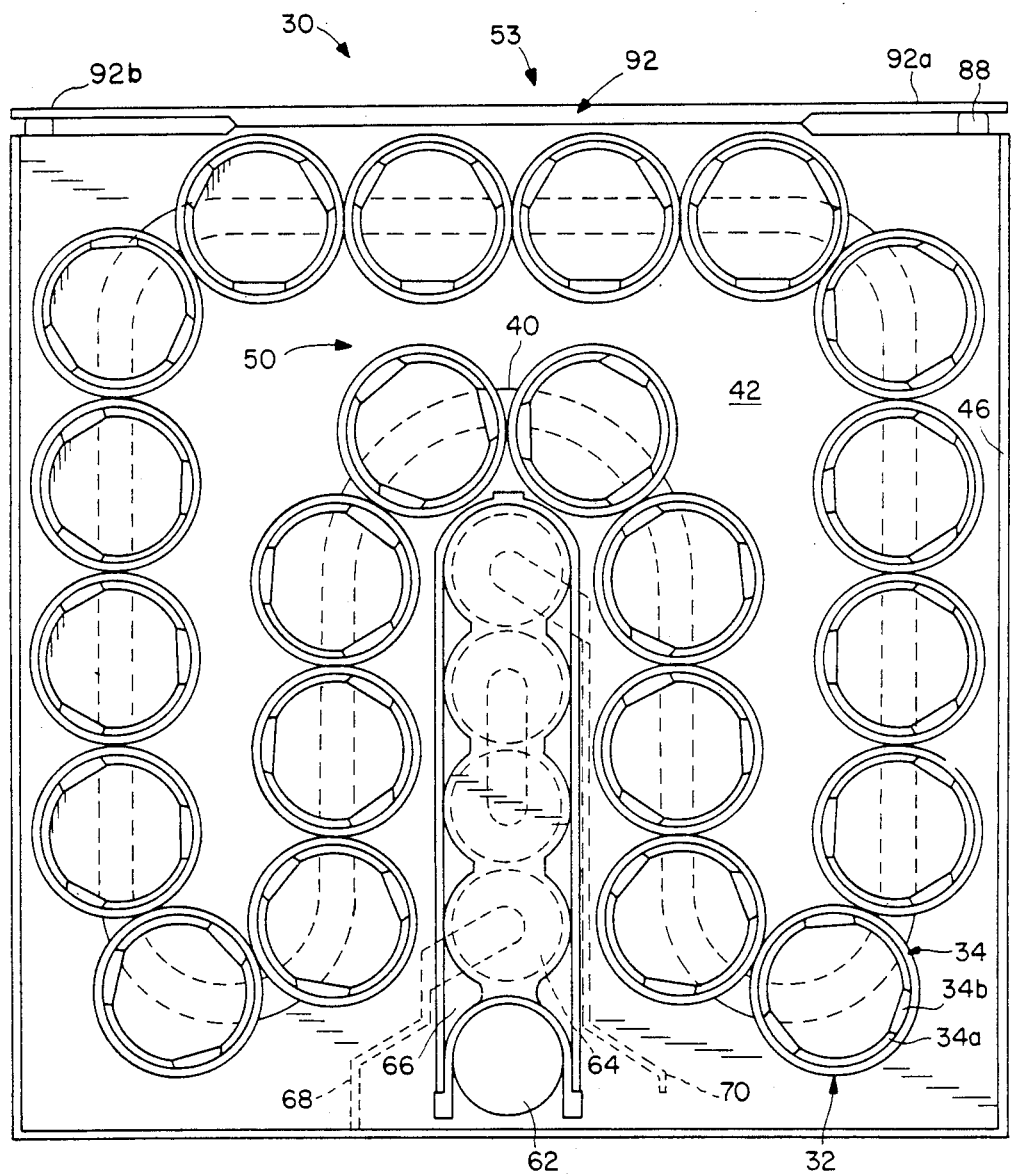
FIG. 3 is a bottom view of the apparatus of FIG. 1 without the containers.

Returning to FIGS. 1-4, each carrier 32 is disposed in a track 40 formed in a track member 42. Track 40, as shown in FIGS. 3 and 4 in particular, has a general double-U shape with one U being smaller than and disposed in the other. The ends of the U's are connected to form a continuous serpentine loop. The bottom of the inside U is semi-circularly shaped, with each of the corners of the track formed as a gradual curve to allow free movement of carriers 32 therearound.

Figure 5:
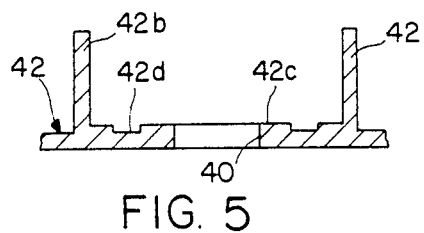
FIGS. 5 and 6 show alternative embodiments of track surfaces of the apparatus of FIG. 1.
Figure 6:
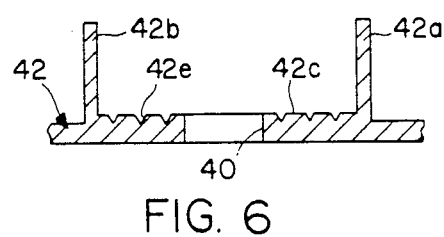

FIGS. 5 and 6 show the detail of a track channel 44 in which support members 36 travel. A pair of vertical barriers 42a, 42b define the sides of the track channel. These barriers serve to define the edges of track channel 44. However, as shown, particularly in FIG. 4, the outer edges of cap 36b do not contact these barriers. Rather, confinement of carriers 32 along track 40 is provided by contact of cup member tube portion 34d.

The undersurface of support member cap 36b rests on the upper surface 42c. Disposed within upper surface 32c are alternatively, rectangular shaped grooves 42d, as shown in FIG. 5, or V-shaped grooves 42e, as shown in FIG. 6. These grooves serve two primary functions. The first is that they collect dirt and debris which is generated as knob member caps 36b slide therealong during operation of apparatus 30. Secondly, they serve to reduce the surface contact area between caps 36b and surface 42c. This makes the caps slide more easily along the surface.

It can be seen that 24 carriers 32 are disposed around track 40. This is all within a lateral distance, when viewed from the front, of less than the width of 6 containers 20.

Track 40 and track member 42 are covered by an upper cover 46 which extends over the entire track area. Cover 46 has downwardly extending sides 46a which are attached to correspondingly upwardly extending marginal sides 42f of track member 42. Sides 46a extend downwardly below the horizontal plate of member 42 as a skirt to generally conceal cup members 34. Four mounting columns extend through apparatus 30 for inserting a screw for anchoring the apparatus to a shelf 48. These columns are formed by upwardly projecting tubular portions 42g, formed in member 42, which contact cover 46 and are in alignment with downwardly extending tubular portions 46b, formed in cover 46, as shown in FIG. 2. Portions 46b extend inside portions 42g to contact the horizontal plate of member 42. Tubular portions 46b each have a longitudinal bore extending through it. The lower portion of the bore in tubular portion 42g is enlarged to accept the head of a screw (not shown). This allows for the insertion of screws through tubular portions 46b for anchoring apparatus 30 to a shelf 48.

As can be seen in FIGS. 3 and 4, track 40 follows a generally serpentine route, as has been described. On the bottom of the inside U is a semicircular turn shown generally at 50. A sprocket wheel 52 is mounted for rotation about an axis 54 which forms the center of the semicircular turn 50. Sprocket wheel 52 has a generally central hub 52a and fingers 52b, which extend radially outward from the hub. These fingers are circumferentially spaced corresponding to the space between support members 36 of adjacent carriers 32. The support members have a predetermined spacing when the cup members 34 are contiguous in track 40.

As will be seen, sprocket wheel 52 is connected through gearing to a drive motor for rotation about axis 54. Thus, as the fingers 52b rotate, they contact or engage support members 36 and force them along track 40 for the general distance of the semicircular turn 50, which may be considered to be a drive region of the track. Because the track is full of carriers 32, that is, the cup members 34 are substantially touching in line, as a carrier is forced along track 40 by sprocket wheel 52, the carriers are forced around the track and back into engagement with sprocket wheel 52, as shown. Further, the sprocket wheel can be rotated in either direction to cause corresponding movement of the carriers in track 40. Thus, any selected carrier, and therefore container which is attached and supported by the carrier, may be presented at the front of apparatus 34 retrieval and return. This front region may thus be referred to as a transfer station 53 since containers are individually and directly accessible there.

Because guide members 38 are always keeping the carriers in the same relative position in the track, when they return to the transfer station, the same side of the container is presented to the user. Thus, if the label on the container is positioned facing the user when it is inserted in the carrier, then it will still be in that position when it returns to the transfer station, thereby directly permitting the user to identify the contents of the container.

Sprocket wheel 52 is fixedly connected to a pinion 56. Pinion 56 is engaged to and through a corresponding gear and pinion assembly, shown generally at 58, to the pinion 60 of a reversible 6-volt DC motor 62. In the preferred embodiment, motor 62 has a rotation speed of 6000 revolutions per minute. With the gearing assembly shown, this causes wheel 52 to rotate at 20 revolutions per minute.

Motor pinion 60 is directly connected to the drive shaft of motor 62. Motor 62 is suspended downwardly from the bottom side of track member 42 adjacent the back central edge of the track member. Mounted alongside motor 62 and extending inwardly toward the center of track member 42 are four commercially available D battery cells 54. These batteries are mounted in a battery casing 66 which holds the batteries in position. The batteries are connected in series and have conductors 68, 70 extending from casing 66 which provide opposite voltage polarities for driving motor 62.

Referring to FIG. 4, at the rear of track member 42 is disposed a pair of generally parallel electrical conductors 72 and 74. Battery terminal 68 is electrically connected to conductor 72, and battery terminal 70 is connected to electrical conductor 74. Extending also parallel with conductors 72, 74 are a pair of co-linear, resilient motor terminal conductors 76 and 78, which extend in opposite directions from the middle rear of track member 42. Conductor 76 is connected to one of the motor terminals at 80, and, correspondingly, conductor 78 is connected to the other motor terminal at 82. As can be seen, the distal ends of conductors 76 and 78 extend between corresponding ends of conductors 72 and 70.

Control means are provided for switching motor 62 in either a forward or reverse direction. A first push rod 84 extends from the front to the rear along one side of track member 42. At the rear it pushes or contacts a downwardly extending tip of conductor 78.

As shown in FIG. 4, a spring chamber 86 is disposed in the front corner of apparatus 30. Spring chamber 86 includes a cylindrical plug 88 which is sized to slidingly fit in spring chamber 86. Plug 88 is biased toward the front of apparatus 30 by a spring 90. In the top of plug 88 is a bore, not shown, into which an end of push rod 84 extends for anchoring the rod. Movement of plug 88 along its longitudinal axis causes push rod 84 to move accordingly. Thus, if plug 88 is pushed to the rear, it forces the distal end of rod 84, which is seated against conductor 78 rearwardly. This movement is used to move conductor 78 from a position in which it is in contact with battery terminal conductor 74 to a position in which it is in contact with battery terminal conductor 72.

Figure 12:
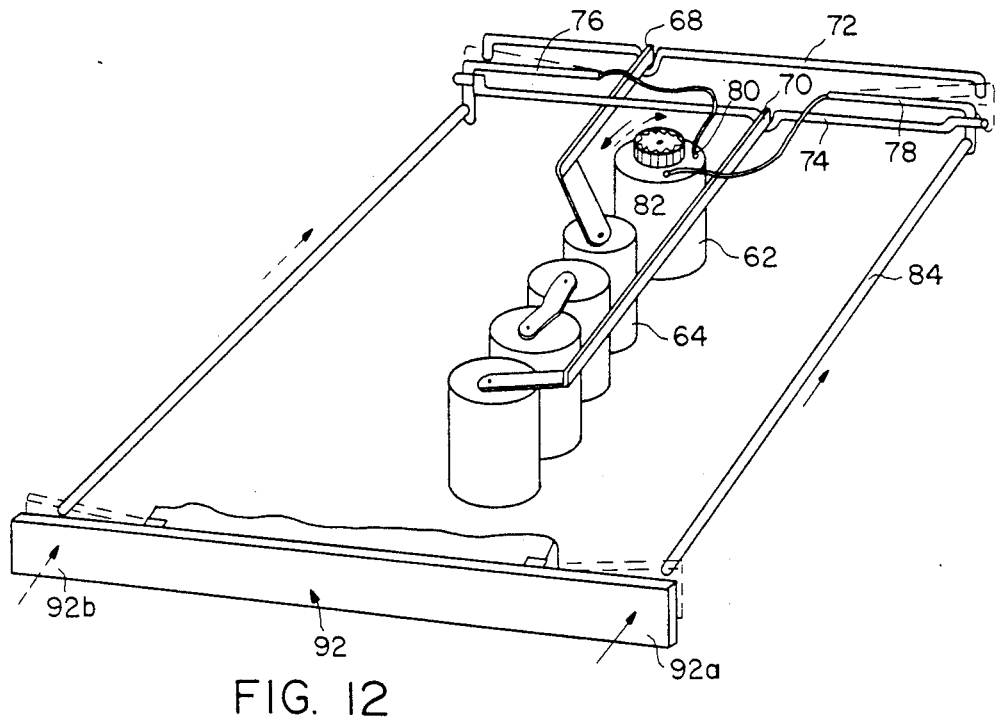
FIG. 12 is a perspective view of the electrical system of the apparatus of FIG. 1.

Plug 88 extends through an aperture in the front face of track member 42 to contact the right end 92a of a push bar 92. End 92a of the push bar is resilient and may be flexed rearwardly by pushing on the front face of the same. This is illustrated by the phantom lines on FIG. 12. Thus, when pressure is applied to the right end of bar 92, conductor 78 contacts battery conductor 72 to form a complete voltage circuit. The voltage from batteries 66 is applied across input terminals 80 and 82 of motor 62. It is preferred that the battery voltages be connected to cause the carriers 32 to travel from right to left across the front transfer region of apparatus 30.

A similar push rod, spring chamber and associated assembly exists on the left side of apparatus 30. The pressing of the left side 92b of push bar 92 reverses the polarity connection of the batteries to the motor 62. This causes reverse rotation of sprocket wheel 52, thereby causing carriers 32 and corresponding containers 20 to travel from left to right across the front transfer station.

Thus, it will be seen that with no pressure applied to the end of push bar 92, the left and right push rods are held in a forward direction, thereby applying the same battery voltage to both terminals of motor 62, making the motor inactive. However, when either end of the push bar is flexed so that the polarity contact of the corresponding motor terminal conductor is connected to the other battery voltage, then the conveyor system is caused to operate with movement corresponding to the end of the bar pressed. Further, it will be seen that bar 92 has a sufficient vertical width to cover track member 42 and cover 46 of apparatus 30, as viewed from the front. Thus, the bar acts both as a switch activator and a cosmetic facade.

It will therefore be appreciated that applicants' invention, particularly as shown in the preferred embodiment, provides an apparatus for storing a substantial number of objects, such as spice or similar containers, in an apparatus which provides direct access of any desired object. Further, it will be seen that such an apparatus is easy to use and install. A variety of containers may be stored using the carriers described as long as they are in a generally predetermined set of sizes defined by the relative radius of cup member 34 and the gripping members 34b.

Certainly many other forms of such a gripping device can be provided which will accomplish the same result. Other ways of driving the carriers around the track are also possible, and the form of the track can take any of a large variety of shapes. Apparatus 30 could be built on a stand with several stacked together. Further, since each container is presented to the front transfer station, the apparatus can be mounted inside a cupboard with the shelf below it still being usable. Further, the apparatus could be inverted, so that it supports objects or containers from below with the tracks and carriers beneath the objects stored.

Thus, while the invention has been particularly shown and descried with reference to the foregoing preferred embodiment, it will be understood by those skilled in the art that other changes in form and detail may be made therein without departing from the spirit and scope of the invention as defined in the claims.

We claim:

1. An apparatus for storing a plurality of containers comprising:
   track means defining a track extending from a transfer station, where a container may be transferred to and from said apparatus;
   a plurality of detached, circular carrier means, each for supporting a container along said track;
   means for maintaining each of said carrier means in a predetermined rotational position relative to said track in the region of said transfer station, said maintaining means including a guide member joined to said carrier means and extending into said track for maintaining the rotational position of said carrier means as it travels along the track;
   selectably operable drive means for moving said carrier means along said track; and
   control means which, when stimulated by a user of the apparatus, activates the drive means and allows the user to access particular containers in the transfer station.

2. An apparatus according to claim 1 wherein said track is continuous, said carrier means each move freely in said track, and said drive means moves said carrier means a predetermined length along said track in a selected drive region of said track.

3. An apparatus according to claim 2 wherein said drive means includes means engageable with a carrier means disposed in said drive region for transporting said engaged carrier means along said track in said drive region.

4. An apparatus according to claim 1 wherein said drive means is selectably operable to move said carrier means in either direction along said track.

5. An apparatus according to claim 4 wherein said drive means further includes a reversible motor having a drive shaft, means drivingly coupled to said motor and engageable with one of said carrier means for applying a force directly to said carrier means over a predetermined length of said track in a direction determined by the direction of rotation of said drive shaft of said motor, wherein said control means includes means for applying a voltage to said motor for rotating said drive shaft alternatively and selectably in one of two opposite directions.

6. An apparatus according to claim 5 wherein said control means includes an elongate bar having resilient ends, each end being movable to apply a voltage to said motor appropriate for rotating said drive shaft in a direction opposite from the direction associated with movement of the other bar end.

7. An apparatus according to claim 5 wherein said motor includes a pair of input terminals; said apparatus further includes first and second source voltage terminals attachable to a voltage source; and said control means includes first and second switch conductors, each connected to a different one of said input terminals and being shiftable between a first position in which it is coupled to said first source terminal, and a second position in which it is coupled to said second source terminal, means for yieldably urging each of said switch conductors toward said first position, and means associated with each of said switch conductors and manually actuatable for shifting the corresponding one of said switch conductors toward said second position.

8. An apparatus according to claim 1 wherein said carrier means includes means for frictionally engaging opposing sides of a container supported thereby.

9. An apparatus according to claim 8 wherein said engaging means includes a plurality of spaced members, at least one of said members being movable from a first position in which the one member is a predetermined distance apart from the other members and a second position in which the one member is a distance apart from the other members greater than the predetermined distance, and means for resiliently urging said one member from said second position toward said first position.

10. An apparatus according to claim 9 wherein said carrier comprises a generally downwardly facing cup sized to receive a portion of a container and said members are resilient and formed integrally in the sides of said cup.

11. The apparatus according to claim 10 wherein said cup has generally cylindrical sides and said members are, in radial cross-section, in the form of chords extending across said cup sides.

12. An apparatus according to claim 11 wherein said members are generally planar and extend at an angle relative to the longitudinal axis of said cup sides so that they are mutually downwardly converging.

13. An apparatus according to claim 12 wherein said members each have an exposed downwardly facing edge which is arcuate when viewed normally from the longitudinal axis of said cup.

14. An apparatus according to claim 1 further comprising means attached to said track means for forming a skirt extending along at least a portion of the periphery of said track means for substantially hiding said carrier means when viewed from a side having said skirt.

15. An apparatus for storing containers of spices or the like having an end with a size within a predetermined range of sizes, said apparatus comprising
   conveyor track means defining a continuous loop track and including a transfer station where containers are inserted into and removed from said apparatus;
   a plurality of downwardly facing cups, each sized to receive a container having an end with a size within the predetermined range of sizes, a plurality of circumferentially spaced projections extending inwardly from the sides of said cup for engaging opposing edges of an end of a container received in said cup, said projections being radially movable and biased radially inwardly for engaging the edges of an end of a container received in said cup;
   means extending from said cup into said track for supporting said cup in said track in a predetermined orientation relative to said track and allowing free movement of said cup along said track;
   gear means having circumferentially spaced radially extending fingers and rotatable about an axis for moving said fingers along a drive region of said track, and thereby engaging a one of said cup-supporting means disposed in said track drive region for forcing said finger-engaged cup along said track in the direction of movement of said fingers along said track, there being a sufficient number of said cups supported in said track that movement of one cup along said drive track region moves said cups along said track sufficiently to move another cup into said track drive region for engaging by one of said fingers; and motor means selectably operable in a first state for rotating said gear means in a first direction and in a second state for rotating said gear means in a second direction, and thereby moving said cups along said track in said first and second directions.

16. An apparatus for storing a plurality of objects comprising:
   a plurality of detached, circular carrier means, each for supporting an object;
   track means defining a continuous track for supporting said carrier means for free movement along said track and including a transfer station where said objects may be transferred to and from said apparatus;
   means attached to said carrier means for maintaining each of said carrier means in a predetermined rotational position relative to said track in the region of said transfer station;
   selectably operable drive means for moving said carrier means along a drive region having a predetermined length less than the entire length of the track; and
   control means which, when stimulated by a user of the apparatus, activates the drive means and allows the user to access particular containers in the transfer station.

17. An apparatus according to claim 16 wherein said drive means includes means engageable with one of said carrier means disposed in said drive region for transporting said engaged carrier means along said track in said drive region.

18. An apparatus according to claim 17 wherein said transporting means includes spaced fingers movable along said drive region of said track for engaging said one of said carrier means in said drive region for forcing said carrier means along said track.

19. An apparatus according to claim 18 wherein said track includes an arcuate stretch in said drive region and said transporting means includes a central hub rotatable about an axis and said fingers are connected to and circumferentially spaced around said hub.

20. An apparatus according to claim 19 wherein there are a sufficient number of said carrier means disposed in said track that movement of one of said carrier means along said drive region pushes others of said carrier means around the track to move another of said carrier means into said drive region.

21. An apparatus according to claim 16 wherein said carrier means holds an object from above with the object extending below it.

22. An apparatus according to claim 21 further comprising means attached to said track means for forming a skirt extending along at least a portion of the periphery of said track means for substantially hiding said carrier means when viewed from a side having said skirt.

23. An apparatus according to claim 16 wherein said drive means is selectably operable to move said carrier means in either direction along said track.

24. An apparatus according to claim 22 wherein said drive means further includes a reversible motor having a drive shaft, means drivingly coupled to said motor and engageable with one of said carrier means for applying a force directly to said carrier means over a predetermined length of said track in a direction determined by the direction of rotation of said drive shaft of said motor, wherein said control means includes means for applying a voltage to said motor for rotating said drive shaft alternatively and selectably in one of two opposite directions.

25. An apparatus according to claim 24 wherein said control includes an elongate bar having resilient ends, each end being movable to apply a voltage to said motor appropriate for rotating said drive shaft in a direction opposite from the direction associated with movement of the other bar end.

26. An apparatus according to claim 24 wherein said motor includes a pair of input terminals; said apparatus further includes first and second source voltage terminals attachable to a voltage source; and said control means includes first and second switch conductors, each connected to a different one of said input terminals and being shiftable between a first position in which it is coupled to said first source terminal, and a second position in which it is coupled to said second source terminal, means for yieldably urging each of said switch conductors toward said first position, and means associated with each of said switch conductors and manually actuatable for shifting the corresponding one of said switch conductors toward said second position.

27. An apparatus according to claim 16 wherein said maintaining means include guide means joined to said carrier means and extending into said track for maintaining the rotational position of said carrier means as it travels along said track.

* * * * *